Patented Mar. 10, 1931

1,796,231

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

OLEIC ACID ESTER

No Drawing. Application filed May 16, 1930. Serial No. 453,101.

My invention relates to new and useful aliphatic esters of higher fatty acids. More specifically, my invention relates to normal butyl oleate.

Although in the past a number of aliphatic esters of oleic acid have been investigated, the normal butyl ester has not been prepared nor described. In fact, until comparatively recently, normal butyl alcohol was considered to be a laboratory curiosity, and the esters were for this reason considered to have no importance. However, since the advent of a commercial source of butyl alcohol, and the rapid rise of the pyroxylin lacquer industry, the butyl esters have acquired a considerable commercial value.

I have now prepared the normal butyl ester of oleic acid, and have found it to be a compound of desirable properties for use in pyroxylin lacquers and other pyroxylin compositions.

While certain of the classical laboratory methods for the preparation of esters, such as the use of the silver salt of the acid and the alkyl halide, may be used for the preparation of normal butyl oleate, it is evident that such methods are impractical and would not be commercially feasible. I have found that the reaction between butanol and oleic acid in the presence of an acid esterification catalyst is a practical method for the manufacture of this ester. This method of production may best be illustrated by the following specific example:

200 lbs. of butanol, 188 lbs. of oleic acid, and 5 lbs. of syrupy phosphoric acid (85% $H_3PO_4$, Fe free) are charged into the kettle and refluxed for sixteen hours. The excess butanol and the water formed in the reaction are then distilled off, and the mass cooled to 80-90° F. The mixture is agitated throughout the entire procedure and the agitation continued during a wash with 10 gals. of water. The agitation is then stopped, and after settling, the water layer is drawn off. The mass is again washed with water and then neutralized with "stronger ammonia water, U. S. P." until alkaline to "brilliant yellow indicator paper". For the above proportions of reactants and catalysts, about 7 lbs. of ammonia water is usually found necessary. After neutralizing, 15 gals. of water are added, and the mixture distilled until the vapor temperature remains at 212° F. for 2½ hrs., water being added to maintain an approximately constant volume. The water layer is then separated, and the ester is treated with a decolorizing material such as activated charcoal, fuller's earth, filtrol, etc. The temperature is maintained at 105° C. during this treatment until the ester is dry, as determined by the ordinary naphtha tolerance test. The butyl oleate is then cooled and filtered. A yield of 90-98% is usually obtained by this method.

Of course, the above procedure may be varied in a number of ways, as, for example, in changing slightly the proportions of the reactants, varying the time of refluxing, etc. Other acid esterification catalysts such as hydrochloric acid or sulphuric acid may be employed, but I have found that the use of phosphoric acid gives a product of superior qualities. If desired, the butyl oleate may, of course, be purified in other ways than by merely washing and decolorizing. For example, an excellent product may be obtained by vacuum distilling the crude ester.

This compound may be identified by any of the standard means usually applied to esters. For example, it may be saponified, and the fatty acid identified by its melting point and other properties. Normal butyl oleate possesses, among others, the following properties. It is a mobile liquid at ordinary temperatures, oily in nature, light yellow in color, and possesses a slight fatty odor. It is insoluble in water, and water is insoluble in the ester. It is miscible with benzene, acetone, butanol, dibutyl phthalate, mesityl oxide, diacetone alcohol, butyl acetate, and butyraldehyde in all proportions from 1:10 to 1:1. It is miscible with ethyl alcohol in proportions up to 1.5 parts of butyl oleate to 10 parts of alcohol, but is immiscible with methanol.

The following are physical and chemical constants of a plant batch of normal butyl oleate:

| | |
|---|---|
| Boiling range (10–18 m.m. Hg) | 235–245° C. |
| Freezing point: | |
|     Opaque | −12.0° C. |
|     Solid | −26.4° C. |
| Specific gravity (20°/20°) | 0.864 |
| Iodine number | 58.3 |
| Saponification number | 134.0 |

It is to be understood that the above data are for a specific batch of normal butyl oleate, and while such data will aid in identifying the compound, I do not wish to limit myself to a product having the exact constants listed. Further, I do not wish to limit myself to any method of manufacture, or to any use or uses of the normal butyl oleate.

Now, having described my invention, what I claim is:

A new composition of matter comprising normal butyl oleate.

In testimony whereof I affix my signature.

WILLIAM J. BANNISTER.